United States Patent
Olivier et al.

(10) Patent No.: US 10,642,234 B2
(45) Date of Patent: May 5, 2020

(54) SYSTEM FOR MANAGING THE ENERGY CONSUMPTION OF A BUILDING

(71) Applicant: Ubiant SA, Lyons (FR)

(72) Inventors: Emmanuel Olivier, Lyons (FR); Saber Mansour, Lyons (FR); Olivier Lefevre, Rillieux la Pape (FR); Romain Bazille, Lyons (FR); François Demares, Paris (FR)

(73) Assignee: Ubiant SA, Lyons (FR)

( * ) Notice: Subject to any disclaimer, the term of this patent is extended or adjusted under 35 U.S.C. 154(b) by 118 days.

(21) Appl. No.: 15/541,666

(22) PCT Filed: Jan. 5, 2016

(86) PCT No.: PCT/FR2016/050002
§ 371 (c)(1),
(2) Date: Jul. 5, 2017

(87) PCT Pub. No.: WO2016/110636
PCT Pub. Date: Jul. 14, 2016

(65) Prior Publication Data
US 2018/0259919 A1     Sep. 13, 2018

(30) Foreign Application Priority Data

Jan. 6, 2015 (FR) .................................... 15 50040

(51) Int. Cl.
*G05B 15/02* (2006.01)
*G05D 23/19* (2006.01)

(52) U.S. Cl.
CPC ......... *G05B 15/02* (2013.01); *G05D 23/1917* (2013.01); *G05D 23/1927* (2013.01);
(Continued)

(58) Field of Classification Search
USPC ........................................................ 700/291
See application file for complete search history.

(56) References Cited

U.S. PATENT DOCUMENTS 8,924,026 B2* 12/2014 Federspiel ......... G05D 23/1934
700/276
2008/0229226 A1* 9/2008 Rowbottom ....... H05B 37/0245
715/771
(Continued)

FOREIGN PATENT DOCUMENTS

FR          2967793        5/2012
WO       WO 92/00557      1/1992
(Continued)

OTHER PUBLICATIONS

International Search Report and the Written Opinion dated Mar. 24, 2016 From the Internatioanl Searching Authority Re. Application No. PCT/FR2016/050002 and Its Translation Into English. (16 Pages).

*Primary Examiner* — Ziaul Karim

(57) ABSTRACT

System (1) for managing the energy consumption of a building including at least one area, incorporating:
  a set of sensors (8) capable of generating information representative of environmental parameters;
  a set of at least one actuator (4-6) capable of acting on the environmental parameters existing in the said area;
  a computer system (2) designed to receive the said information from the said sensors (8), and to send instructions to the said actuators (4-6), while executing regulation process for the said actuators (4-6) in order to comply, with a set of at least two predetermined criteria;
wherein it also incorporates:
  a routing device (3) connected to the said IT system (2), the said sensors (8) and the said actuators (4-6), designed to transmit information representative of environmental parameters to the IT system (2) and set levels to the said actuators (4-6);
(Continued)

a man-machine interface device (10) located in the said area.

9 Claims, 2 Drawing Sheets

(52) U.S. Cl.
    CPC ............. *G05B 2219/2639* (2013.01); *G05B 2219/2642* (2013.01)

(56) References Cited

U.S. PATENT DOCUMENTS

| | | | | |
|---|---|---|---|---|
| 2009/0065596 A1* | 3/2009 | Seem | ................ | F24F 11/30 236/51 |
| 2009/0065598 A1* | 3/2009 | Quirino | ................ | F24F 11/30 236/51 |
| 2011/0178640 A1 | 7/2011 | Schmidt | | |
| 2013/0190940 A1 | 7/2013 | Sloop et al. | | |
| 2015/0094860 A1* | 4/2015 | Finnerty | ................ | G05B 15/02 700/275 |
| 2015/0127712 A1* | 5/2015 | Fadell | ................ | G06Q 10/083 709/202 |
| 2015/0256355 A1* | 9/2015 | Pera | ................ | H04L 12/2803 700/90 |
| 2016/0061469 A1* | 3/2016 | Albonesi | ................ | H02J 3/14 700/276 |
| 2016/0195864 A1* | 7/2016 | Kim | ................ | G05B 15/02 709/221 |

FOREIGN PATENT DOCUMENTS

| | | |
|---|---|---|
| WO | WO 2006/035472 | 4/2006 |
| WO | WO 2013/144820 | 10/2013 |
| WO | WO 2014/085777 | 6/2014 |
| WO | WO 2016/110636 | 7/2016 |

\* cited by examiner

SYSTEM FOR MANAGING THE ENERGY CONSUMPTION OF A BUILDING

TECHNICAL DOMAIN

The invention pertains to the field of energy and, more specifically, to the management of energy consumption in buildings. The term "building" means any type of building intended for use as a dwelling or business premises, and more generally for the reception of people. The invention pertains more specifically to a system for the overall management of the energy consumed in a building or, by extension, in a group of buildings. More specifically, it addresses an architecture of means that allows great adaptability to changes of configuration of the building's energy installations, as well as to the outdoor conditions, the comfort experienced by the users, and the way in which the different areas of the building are used. It is specified that an "area" is arbitrarily defined during the configuration of the system, and may be one part of a room or a group of rooms.

PRIOR ART

In general, the management of the energy consumption of buildings is a growing concern. There are relatively simple systems that make it possible to take account of a consumption-related criterion such as, for example, not exceeding a threshold of electrical power consumed by heating appliances, in particular. Some electrical installations thus include de-energizers that cut off the power consumption of certain appliances when the overall power consumption in a building exceeds a predetermined threshold. On a broader scale, so-called "elimination" or "adjustment" mechanisms are known and implemented by electric power suppliers, whereby the electrical consumption of certain users is limited for periods defined by the power supplier.

While achieving a certain effectiveness, these systems remain rudimentary, in the sense that they only take one particular criterion into account for the summary regulation of energy consumption.

In conventional regulation, only data from sensors and/or statistical databases are taken into account to manage the various conventional automation functions (light, air quality, temperature, and energy management). However, none of these systems takes into account, in their adjustment algorithms, the actual feelings or activities of the occupants of the area concerned. Existing systems on the market are capable of handling either comfort or energy saving, but never perfectly managing the two, because the behavior of the occupants is never taken into account.

Furthermore, in documents US 2011/178 640, WO 2006/35472, and WO 2013/144 820, centralized home automation systems have been proposed that make it possible to communicate with different appliances distributed within a building, using a central information technology system that regulates the operation of each of the said appliances.

While these systems provide an improvement in terms of centralized management, they have the disadvantage that they are not very adaptable to changes in the criteria to be fulfilled and achieving the desired energy regulation, since their regulation model is based on steering the appliances and not the environmental characteristics that the occupant subjectively feels.

Document FR 2 967 793 describes a home automation system using a multi-agent model that is embedded within the building or within the equipment, that imposes a large amount of intercommunication between the various sensors and/or actuators, meaning that such a system is not functional. Moreover, such a system is ultimately not adapted to the regulation of a group of buildings which requires a management model for a higher scale than that of the building.

DESCRIPTION OF THE INVENTION

Thus there is a need for greater versatility in energy management systems, to take account of the evolving operation of the appliances that can be installed in a building, as well as of the desires and needs of its users, and of changes in weather conditions, with can vary quickly and unpredictably.

To this end, the Applicant has therefore devised and designed a system based on environmental parameters such as subjectively perceived by the occupant in the area he/she is occupying, with constraint to compliance with one or more energy objectives. This multi-constraint management is provided by a device allowing the occupant of an area to act on the system, and allowing the system to influence the actions of the occupant.

This multifactorial management system for energy consumption in buildings includes at least one area endowed with a set of sensors capable of generating information representative of the environmental conditions subjectively perceived by the occupant—in particular temperature and/or brightness, or the quality of the air within the area in which they are installed. This system also incorporates at least one actuator capable of acting in combination with at least one energy consumption criterion, and at least one comfort criterion concerning the temperature and/or the brightness prevailing in the area. The system also includes an information technology system designed to receive this information from the sensors and to send instructions to the actuators. This information technology system—which will preferably be located outside the building and will preferably be cloud-based—executes a system of regulation of the actuators via a multi-agent mechanism, in order to comply with a set of at least two predetermined criteria, arbitrating optimally between user comfort and energy efficiency.

In addition, this system also incorporates a routing device connected to the information technology (IT) system, to the sensors and to the actuators, and equipped to transmit information representative of the environmental parameters to the IT system, as well as to send state instructions concerning the environmental parameters to the relevant actuators. Thus, the multi-agent system operates by modeling each of the sensors and actuators, constituting a set of virtualized agents, and performing the various tasks of negotiation between the virtualized agents within an IT system that is offsite and is advantageously connected to the building via the routing device, via the Internet.

The system further includes a man-machine interface device located within the area under consideration, and connected to the routing device. This interface device incorporates:
  means for displaying information from the IT system on which the multi-agent system is operating;
  and means for acquiring information about the configuration of the actuators and/or sensors present within the area, and information concerning instructions input by the users present in the area, concerning the desired or perceived state of the environmental parameters or the activity happening within the area.

In other words, the system according to the invention incorporates an ensemble of actuators that are capable of acting concomitantly—for example, on the temperature or on the brightness prevailing within a given area of the building—to fulfill a certain number of criteria that may be of differing nature. These criteria may concern overall cost factors, such as limiting the volume or the cumulative cost of the building's energy consumption over a given period of time. They may also concern intensive financial considerations aimed at limiting energy consumption per unit of area. The criteria may also incorporate a more-comprehensive management of a building or a set of buildings administered by the same IT system.

According to the invention, the multi-agent computer system controlling the environmental parameters is in communication with the sensors and the actuators via a routing device and a man-machine interface that are located in close proximity within the area. The routing device handles the transmission of information between the actuators and the IT system, federating the various protocols that might be used by the various actuators and sensors with a conventional network protocol, such as TCP/IP or the like. The routing device may communicate with the man-machine interface device by which users receive information from the IT system or input information of a wide variety of types, which will be covered in detail subsequently, and that are transmitted to the IT system to modify the operation of the management process.

In practice, the sensors capable of generating the information representative of the environmental parameters may be individual devices located preferably at ideal points within the area, or else may be integrated directly into the man-machine interface device. This may be particularly the case for environmental parameters that do not require to be measured at a very particular location within the area, but that are actually very constant over the whole volume of the area. For example, the environmental parameters can be chosen from the group consisting of energy consumption, atmospheric pressure, luminosity, temperature, carbon dioxide level, sound intensity, humidity level, nearby user presence, the level of volatile organic compounds, or any other environmental parameter that might have an influence in the process of regulation of energy consumption and the comfort subjectively perceived by users.

In practice, the man machine interface device and the routing device can be advantageously integrated into a common unit and constitute a single appliance. It is also possible, conversely, for the routing device to be independent of the man-machine interface device and linked to the latter via various types of connection, whether cable-based or otherwise. It is also possible for the routing device to be connected to a multiple man-machine interface devices located in different areas.

Advantageously, in practice, the man-machine interface device can include an electronic control unit capable of executing a program generating basic instructions for the actuators, in the event of an interruption of connection between routing devices and the IT system. In other words, the man-machine device can autonomously control the various actuators connected to it, in replacement of the global IT system when the latter is inaccessible because of a connection outage. In this case, the man-machine interface device executes a backup scenario making it possible to send instructions to the various actuators in accordance with the information available locally, without being able to take into account the evolutions in the various criteria managed by the global IT system. This backup scenario can be sent by the global computer system on a regular basis and, for example, at each structural change or change of instructions.

In practice, the multiple actuators can be controlled by the IT system via the routing device, and even via the human machine interface device. They can pertain to sources of heat such as radiators or air-conditioning systems, as well as mechanisms for solar shading or illumination. It will be noted here that, in the case of a heating function, the multi-agent management engine makes it possible to take advantage of the combination of the heat source constituted by radiators or the like, with the heat source constituted by outside solar radiation.

According to another characteristic of the invention, the man-machine interface device incorporates a means of information input. Advantageously, in practice, such a means of information acquisition can work via contactless, optical or near-field communications.

This information entry device can, in particular, be used for the input of information pertaining to the configuration of actuators or sensors. In this case, it is possible to add, remove or relocate actuators or sensors by passing it close to the man-machine interface device. This operation thus allows the transmission of an actuator's or sensor's identifier to the IT system, and its association with the area in which it is present. In this case, the IT system, which will advantageously incorporate a database of actuators and/or sensors, will use the aforesaid identifier to integrate the new sensor or the new actuator into the multi-agent regulation process. The database can also include, for each actuator/sensor, the description of the cable-based or wireless communication protocol, and the list of environmental parameters addressed by this actuator/sensor.

According to another characteristic of the invention, the man-machine interface device can include means for displaying information from the IT system. This information can be of various types, and is advantageously displayed by optical devices, notably a set of indicator lights, of which the number of active indicators and/or their color makes it possible to indicate the value of the information in question. This display system can also consist of a screen displaying alphanumeric characters or icons, or any other form of displaying data for a user. This display can be combined with messages or haptic or audible feedback.

The nature of the information concerned can be, for example, an indication of the instantaneous or cumulative level of energy consumption within the zone in which the man-machine interface device is installed. It can also be an indication pertaining to the comparison of this instantaneous or cumulative consumption with the level of consumption in other areas of the building, or in relation to other buildings of the same type or not belonging to a community, or else information about the level of satisfaction of the criteria used by the multi-agent system in operation within the IT system. The reference consumption measurement will be that of the index of the energy meter of the supplier concerned (gas, water or electrical power) detected by a sensor or read manually at regular intervals.

As an option configurable from the IT system, the user can display the consumption within the zone where the interface device is installed, and compare it with other areas in which the same such interface devices are installed.

As a variant, information of different natures may be displayed simultaneously.

BRIEF DESCRIPTION OF THE ILLUSTRATIONS

The manner of implementation of the invention, and the advantages thereof, will emerge clearly from the description of the embodiment which follows, aided by the appended illustrations, in which.

DETAILED DESCRIPTION

Figure 1:
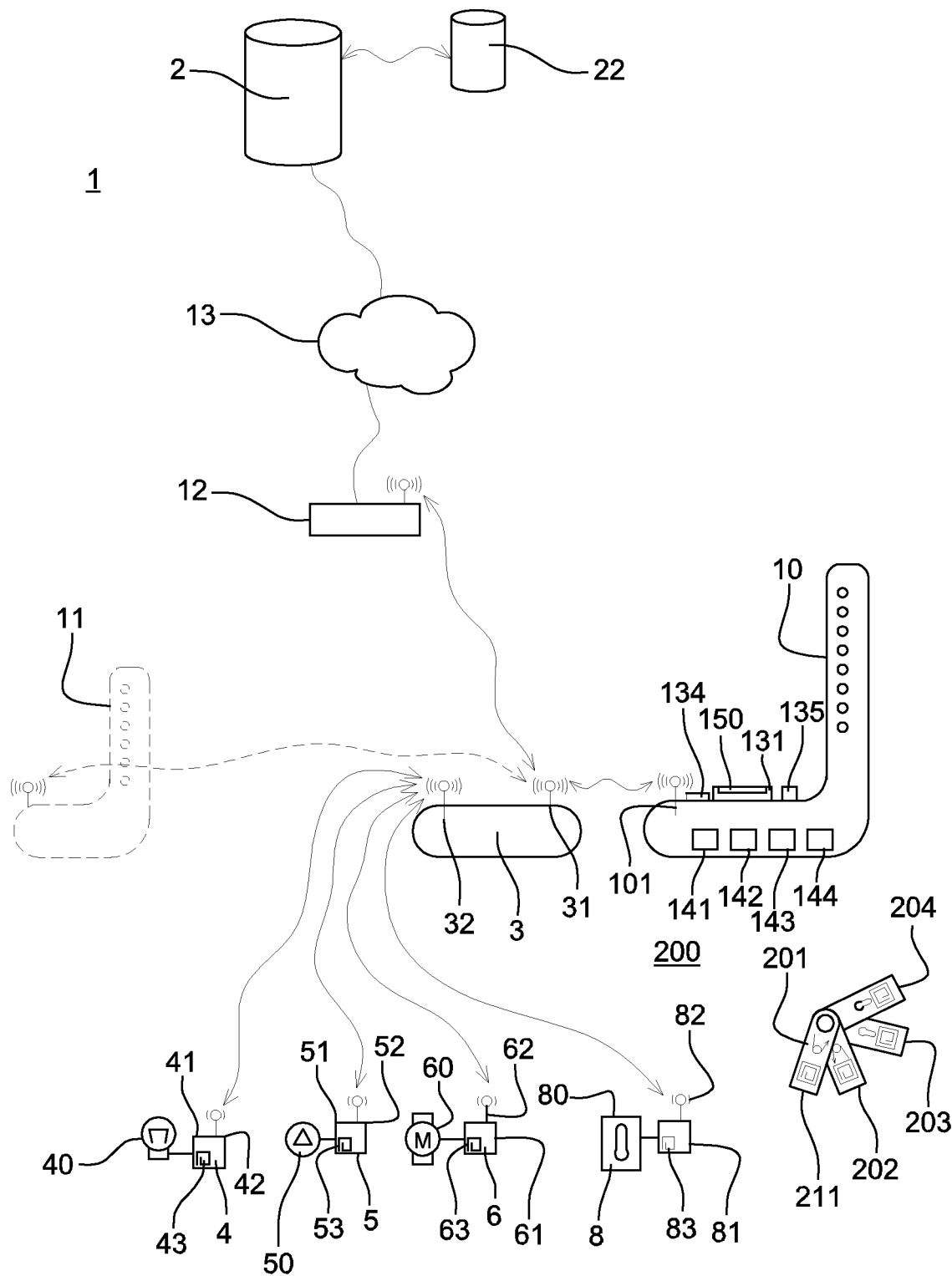
FIG. 1 is a simplified schematic showing the various parts of a system according to the invention.

As already explained, the invention pertains to a system 1 for managing the electrical consumption of a building that is composed—as illustrated in a simplified manner in FIG. 1—of a cloud computing system 2 connected via a routing device 3 to a set of actuators 4-6 and to a sensor 8, as well as to a man-machine interface device 10. This device 10 makes it possible to view and interchange information between the IT system 2 and the users present in the area in question. In the example illustrated, the three actuators 4-6 include a light bulb 40 illuminating a part of the area in which it is installed. This light bulb 40 is associated with an electronic device 41 enabling the bulb 40 to be switched on or off, possibly in a gradual manner. This electronic device 41 also includes a wireless communication circuit 42 and a near-field communication (NFC) circuit 43. The second actuator 5 is a pump 50 integrated into the circulation circuit of a heating installation. This pump 50 is associated with an electronic circuit 51 also incorporating a wireless communication circuit 52 and a near-field communication circuit 53. The actuator 6 is a motor 60 capable of acting on a sun blind system—for example by winding or unwinding a blind, or by orienting the blades of a shade system. The motor 60 is associated with an electronic control 61 also incorporating a wireless communication circuit 62 and a near-field communication circuit 63.

Of course, these are only particular examples of actuators, and other types of actuator can be integrated into the system of the invention without difficulty. One can particularly cite electrical heating systems incorporating an actuator, composed of an electrical switch and a resistive circuit, or of an air conditioner or a ventilation circuit.

In the illustrated form, the system also includes a sensor 8—represented as a temperature sensor 80—associated with an electronic circuit 81 incorporating a wireless communication circuit 82 and a near-field communication circuit 83. These various sensors and actuators 4-8 communicate with the routing device or gateway 3, using a wireless communication protocol—preferably one with low energy consumption, such as "Bluetooth Low-Energy" or protocols such as that developed by the Enocean® company, approved by the International Electrotechnical Commission as per the ISO/IEC 14543-3-10 standard.

The gateway 3 will thus be equipped with a communication circuit 31 enabling the sending and receiving of information to and from actuators and sensors 4-8. The routing circuit 3 also incorporates a second communication circuit 32 making it possible to communicate with, firstly, the man-machine interface device 10 and, secondly, the IT system 2.

In the form illustrated, this communication is conducted via a wireless protocol such as WiFi or the like. More precisely, the routing device 3 is connected to the IT system 2 via a network termination unit 12 with which, in the illustrated form, it communicates by wireless communication. This network termination unit 12 is connected—for example, via the public Internet network 13—to the IT system hosted in the cloud 2. Of course, all of its communications can also be carried out by cable-based means without departing from the scope of the invention. To ensure secure operation, it is possible to encrypt the communication between the routing device and the IT system.

Likewise, the gateway 3 can be connected to other man-machine interface devices 11, and serve as a common gateway for multiple man-machine interface devices located in different areas of the building. In the illustrated form, this routing device 3 is shown as a separate device from the man-machine interface device 10 but, as already explained, these two devices could be incorporated within one single appliance.

In the form illustrated, the routing device 3 communicates via a wireless protocol with the man-machine interface devices 1, being itself equipped with a communication circuit 101. Of course, this communication could also be take place via a cable-based medium.

Figure 2:
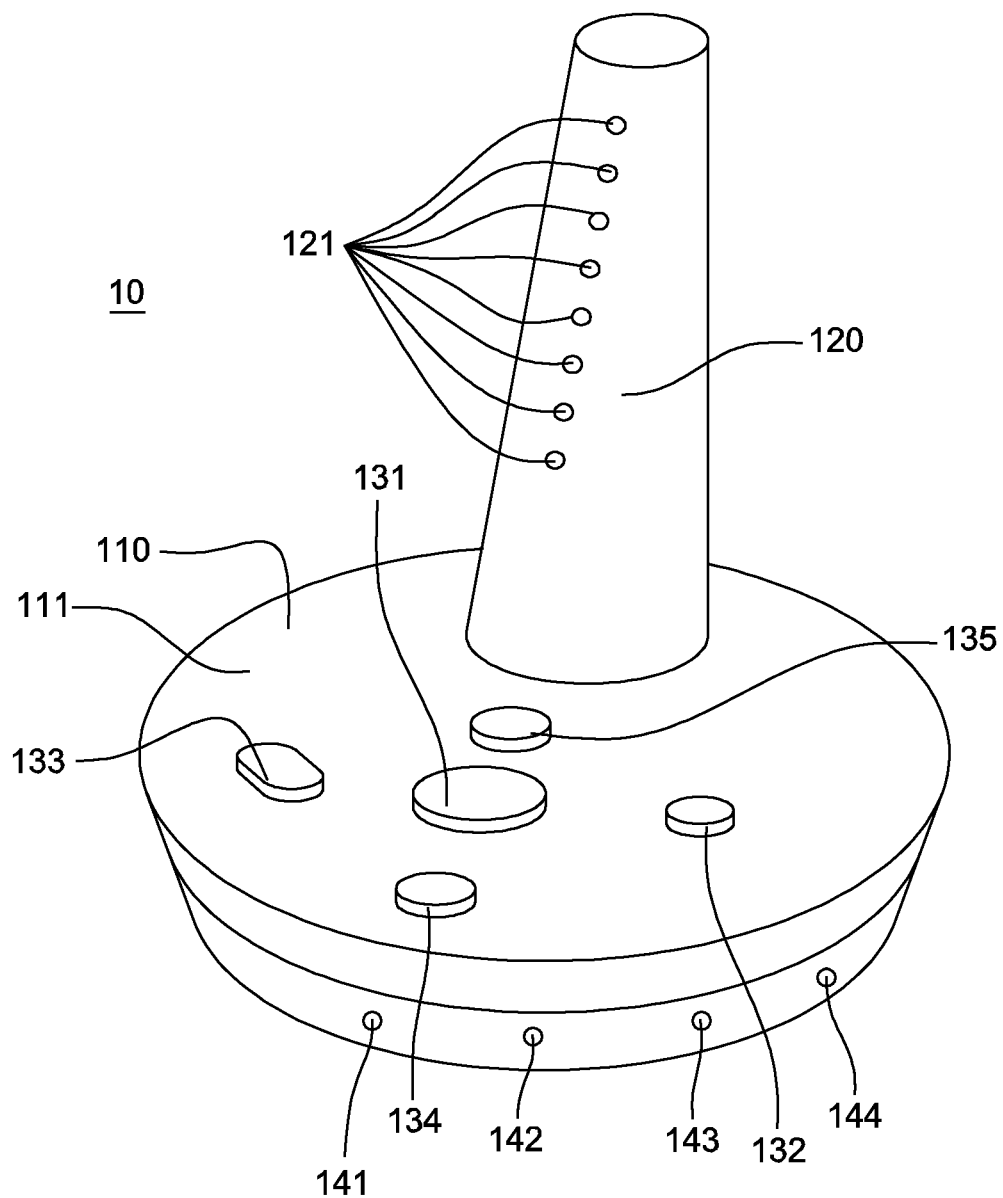
FIG. 2 is a summary view in perspective of the man-machine interface device of the system in FIG. 1.

As illustrated in FIGS. 1 and 2, the man-machine interface device 10 is shown as a base 110 equipped with different buttons 131-135 present on its upper face 111. In the illustrated form, the buttons 132-135 allow the user to enter different types of instructions. By way of example, the four principal instructions could be:

put the system on standby;

an operating instruction in automatic mode, by which the system independently determines the instructions to be issued to the actuators, as a function of predetermined management criteria;

an instruction from operation in a mode providing greater comfort—for example, by increasing the temperature or brightening the lighting, in relaxation of the constraints intended to limit energy consumption in a broad sense.

an instruction from operation in a mode providing greater cost efficiency—for example, by reducing the temperature or lighting, in strengthening of the constraints intended to limit energy consumption.

The flexibility instilled in the system in these four modes is determined by the behavior of the users and the state of the subjectively perceived or desired environmental parameters. The thresholds are adjusted automatically by the multi-agent system running in the cloud, without any specific programming other than the establishment of the energy consumption targets during the period selected by the user. The subjectively-felt comfort is deduced by successive learning phases as a user requests adjustments in a given context according to the state of the environmental parameters simultaneously influenced by the sensors and actuators.

In the form illustrated in FIG. 2, the central button 131 depends on a near-field communication (NFC) circuit 150. This circuit 150 makes it possible to communicate with devices equipped with complementary circuits—particularly the circuits 43, 53, 63, 83 of the actuators and sensors 4-8 referred to above. When one of these circuits is in close proximity to the circuit 150, the interface device 10 then receives the identifier of the actuator or sensor. In the illustrated form, the central button 131 at which the NFC circuit 150 is located also plays the role of enabling the reading of the corresponding circuit of the approached close-proximity device. A visual, audible or haptic signal can be issued to confirm the proper reading of the NFC circuit. This information is transmitted to the IT system 2, which is interfaced with a database 22 listing the various devices that can be incorporated into the overall system, with their principal functional characteristics, ergo essentially the environmental factors that they affect or measure, the communication protocols, and how to they are interpreted. In doing so, the appliance is then incorporated into the multi-agent model running within the IT system 2. The appliance is then added, being assigned to the area of the building where the man-machine interface device through which this addition transited is located.

Obviously, other configurations are possible, in which—when an actuator or sensor is added—the main characteristics for integration into the multi-agent computing model are also transmitted to the computer system, without using the database 22.

Additionally, the NFC circuit 150 can also be used to acquire a variety of instructions from the user. For this, a user can be provided with a set 200 object labels 201, 202, 203, 204 each incorporating an NFC circuit 211 of which the identifier corresponds to a particular instruction—for example, for entry into an operating mode requiring maximum or minimum illumination, or else instructions for modifying the criteria of the regulation process executed by the IT system 2. One of these circuits can, in particular, make it possible to identify a specific user, in view of putting the system in a preferred configuration for the user in question.

Additionally, the man-machine interface device 10 can be equipped with different probes or sensors 170-173 for measuring environmental parameters having an impact on the regulation process. The information items produced from these sensors can be transmitted to the IT system 2 in the same way as the instructions entered via the buttons or via the NFC circuit 150.

As illustrated in FIG. 2, the man-machine interface device 10 incorporates a special region, configured in the form of a column 120, and incorporating various illuminating devices 121. These illuminating devices 121—incorporating, for example, light-emitting diodes—make it possible to display different information from the computer system 2, via a differing number of illuminated components or illumination sequence (order and frequency). In an illustrated form, it is also possible for the entire column 120 to illuminate with a color at an intensity representative of a data item generated by the IT system 2.

Obviously, the information displayed by all the display systems can also correspond to measurements made by the sensors 141-144 present on the device 10 itself and, therefore, the associated environmental factors.

As already explained, the man-machine interface device 10 can incorporate electronic means for effectively controlling the influence of the actuators on the desired state of the environmental parameters 4-6 when communication with the IT system 2 is not possible—for example, in the event of a network connection outage. In this case, the electronic means provide regulation in downgraded mode, in which only the locally-available environmental parameters are integrated into the calculation scenario.

It is clear from the foregoing that the system according to the invention has multiple advantages—particularly that of allowing self-organization and self-configuration of the system as a function of the addition and withdrawal of actuators and/or sensors, which can be performed by users directly. This architecture incorporates the advantages of regulation by a multi-agent system, allowing user-driven control according to their subjective feelings, with multifactor regulation in accordance with user input concerning, in particular, their level of comfort. The multi-agent system used can be programmed, for example, from "Madkit", which is an Open Source generic multi-agent platform architecture.

The invention claimed is:

1. System (1) for managing an energy consumption of a building including at least one area, incorporating:

a set of sensors (8) capable of generating information representative of environmental parameters, including a temperature sensor and a brightness sensor installed in an area;

at least one actuator (4-6) configured to adjust the temperature and/or brightness in the said area;

a computer system (2) designed to receive the said information from the said sensors (8), and to send instructions to the said actuators (4-6), and to implement a process of regulation of the said actuators (4-6) via a multi-agents system, in order to comply with a set of at least two predetermined criteria, a routing device (3) connected to the said computer system (2), the said sensors (8) and the said actuators (4-6), designed to transmit information representative of environmental parameters to the computer system (2) and set levels to the said actuators (4-6);

a man-machine interface device (10) located in the said area, connected to said routing device (2), and incorporating:

a system (121) for displaying an indication based on information items from the computer system (2), the indication is selected from a group consisting of:

an indication of an instantaneous level of energy consumption, an indication of a cumulative level of energy consumption as a function of a targets set by the user, an indication pertaining to a comparison of the instantaneous level of energy consumption with the cumulative level of energy consumption of buildings of a same type whose statistics are compiled by the computer system, and an indication pertaining to a comparison of the cumulative level of energy consumption with the level of consumption of buildings of a same type whose statistics are compiled by the computer system;

means (131-135, 150) of entering information pertaining to a configuration of the actuators and/or sensors present in the area, and to instructions from user present in the area;

wherein said multi-agents system is configured to search and apply an arbitration between user comfort and energy efficiency;

wherein the man-machine interface device incorporates an electronic control unit capable of executing a program generating set levels for the actuators in an event of a break in the connection between the routing device (3) and the computer system (2).

2. System in accordance with claim 1, wherein the man-machine interface device incorporates at least a part of the sensors (141-144) capable of generating information representative of environmental parameters.

3. System in accordance with claim 2, wherein the environmental parameters are selected from a group including energy consumption, atmospheric pressure, temperature, carbon dioxide level, sound level, brightness, relative humidity, presence of users, and a level of volatile organic compounds.

4. System in accordance with claim 1, wherein the man-machine interface device (10) and the routing device (3) are incorporated within one unit.

5. System in accordance with claim 1, wherein one of the actuators is a heat source and a second actuator is a light or sun blind device.

6. System in accordance with claim 1, wherein an information acquisition system (150) operates via contactless communication.

7. System in accordance with claim 6, wherein an information relating to a configuration of the actuators and/or sensors contains an identifier for the actuator and/or sensor.

8. System in accordance with claim 6, wherein the computer system (2) incorporates a database (22) of actuators and/or sensors that can be integrated into the set of sensors and/or the at least one actuator, identified by their identifier.

9. System in accordance with claim 6, wherein the multi-agent system applies the arbitration by modeling each of the plurality of sensors and the at least one actuator, constituting a set of virtualized agents, and performing negotiation between the virtualized agents.

* * * * *